Figure 1:
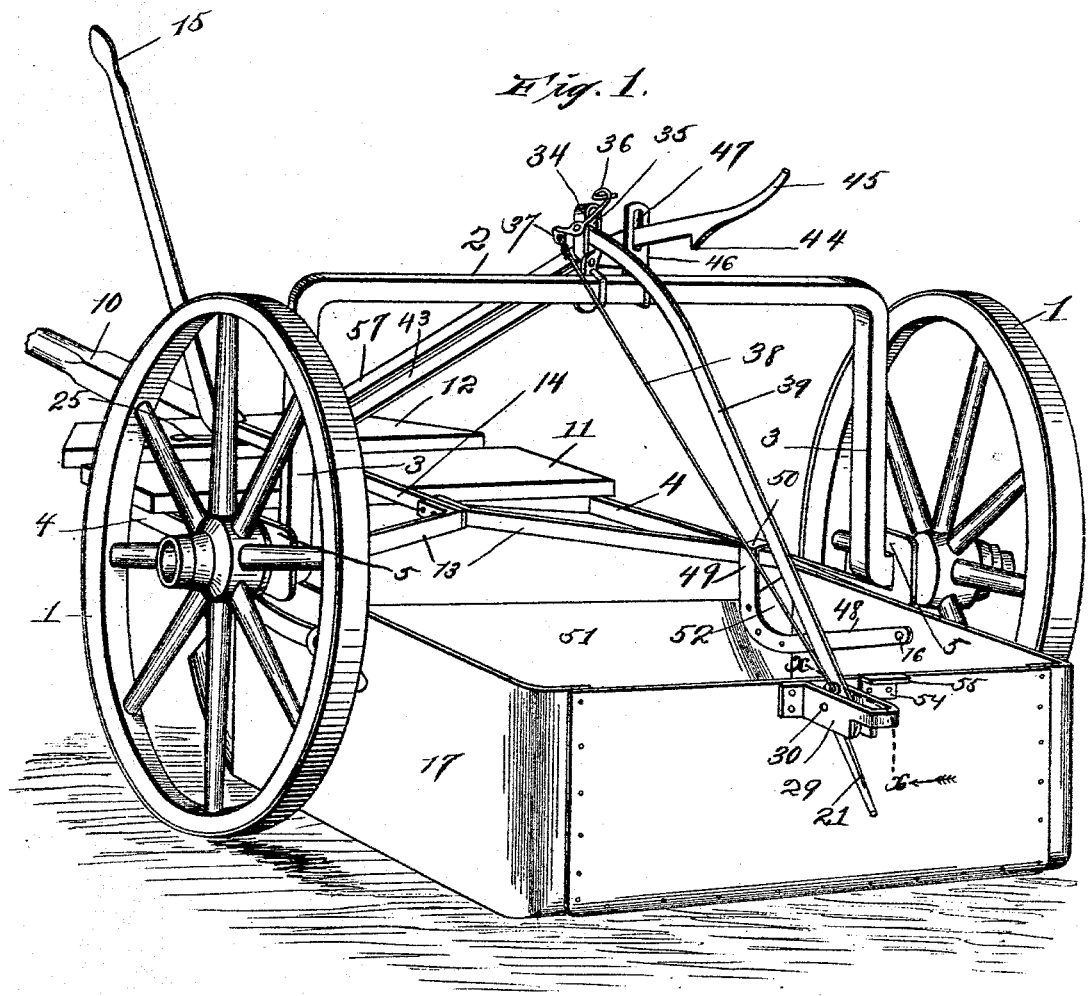

(No Model.)  J. R. WILLIAMS.  3 Sheets—Sheet 1.
WHEELED SCRAPER.

No. 515,982. Patented Mar. 6, 1894.

(No Model.) 3 Sheets—Sheet 2.
J. R. WILLIAMS.
WHEELED SCRAPER.
No. 515,982. Patented Mar. 6, 1894.
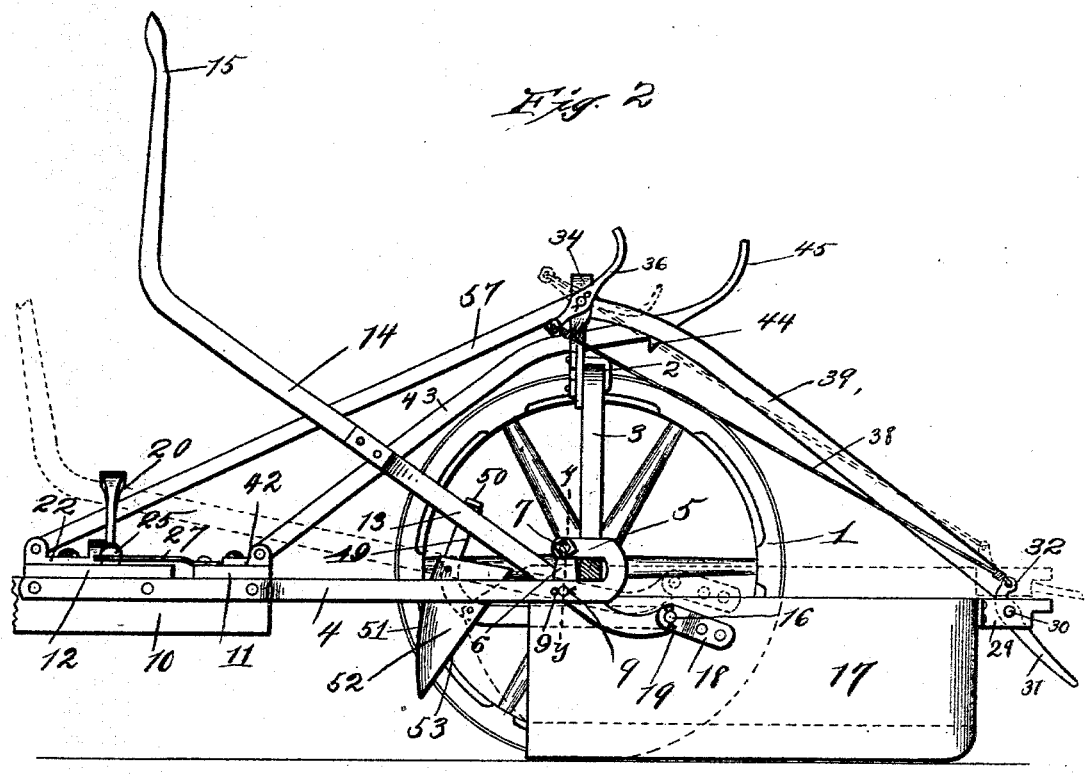
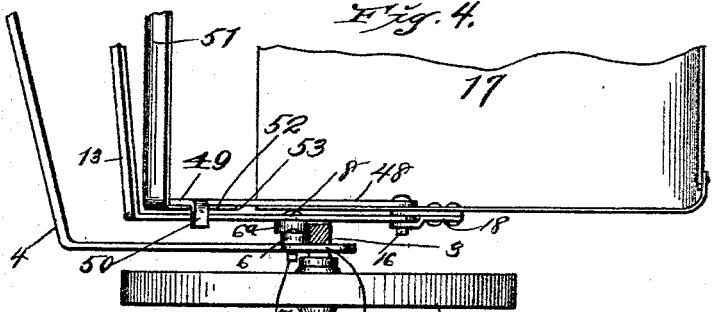
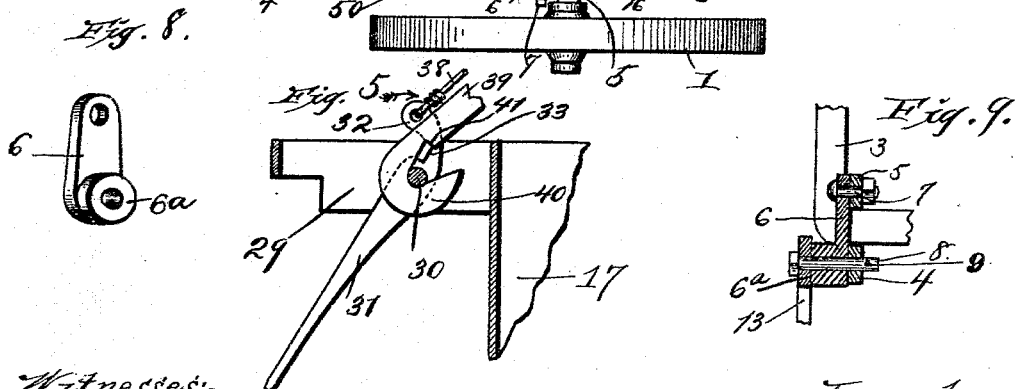
Witnesses:
M. P. Smith.
C. J. Thorpe
Inventor:-
John R. Williams
By Hipson & Hipson
Att'ys
THE NATIONAL LITHOGRAPHING COMPANY,
WASHINGTON, D. C.

(No Model.) 3 Sheets—Sheet 3.
J. R. WILLIAMS.
WHEELED SCRAPER.
No. 515,982. Patented Mar. 6, 1894.
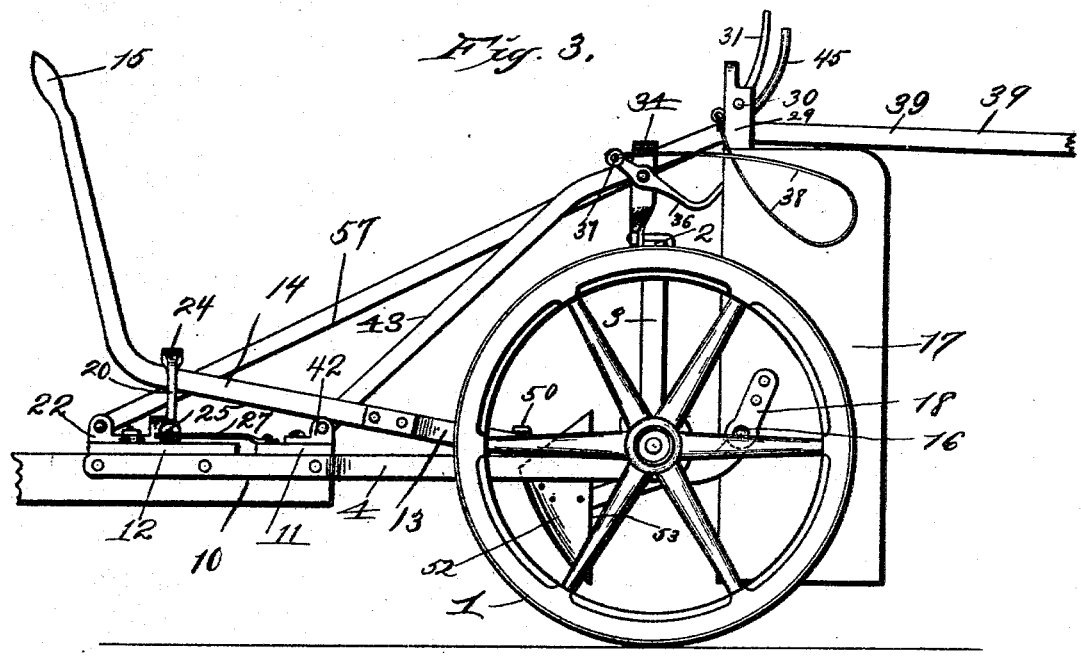
Fig. 3.
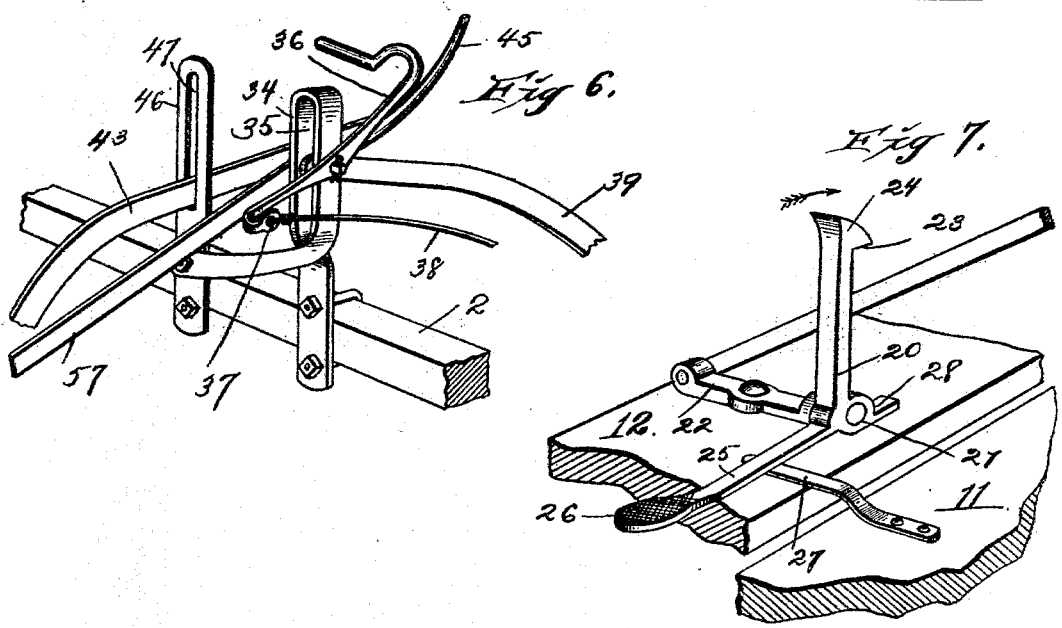
Fig. 6.
Fig. 7.
Witnesses:
M. P. Smith
G. J. Thorpe
Inventor:
John R. Williams
By Higdon & Higdon
Att'ys

UNITED STATES PATENT OFFICE.

JOHN R. WILLIAMS, OF KANSAS CITY, MISSOURI.

WHEELED SCRAPER.

SPECIFICATION forming part of Letters Patent No. 515,982, dated March 6, 1894.

Application filed July 13, 1893. Serial No. 480,340. (No model.)

*To all whom it may concern:*

Be it known that I, JOHN R. WILLIAMS, of Kansas City, Jackson county, Missouri, have invented certain new and useful Improvements in Wheeled Scrapers, of which the following is a full, clear, and exact description, reference being had to the accompanying drawings, forming a part hereof.

My invention relates to wheeled scrapers, and the objects of my invention, are to produce a machine of this character which is effective in operation, under perfect control of the driver, and which is simple, strong, durable and comparatively inexpensive of construction.

With these objects in view, my invention consists in certain peculiar and novel features of construction and combination of parts, as will be hereinafter described and claimed.

In order that my invention may be fully understood, I will proceed to describe it with reference to the accompanying drawings, in which—

Figure 1, is a perspective view of a wheeled scraper constructed in accordance with my invention. Fig. 2, is a side elevation of the same with the near wheel removed, and showing the scraper-box in operative position to receive the load, and showing it in dotted lines in position for transit. Fig. 3, is a side elevation of the same, and showing the position assumed by the scraper box when dumping or delivering the load. Fig. 4, is a top plan view of one side of the machine, and showing the axle in section. Fig. 5, is an enlarged vertical sectional view taken on the line *x—x* of Fig. 1 and as viewed in the direction indicated by the arrow. Fig. 6, is a perspective view enlarged of the upper portion of the machine, to more clearly disclose the construction and arrangement of the upper ends of the locking bars, the trip-lever and the forward brace-bar. Fig. 7, is a detail perspective view of the spring-actuated catch by which the gate is adapted to be held in closed position. Fig. 8, is a detail perspective view of a link-plate, used in the construction of the machine. Fig. 9, is a vertical sectional view taken on the line *y—y* of Fig. 2, to more clearly show the manner of securing the side bars upon the axle.

Previous to my invention, in machines of this character, in desiring to load, it has been necessary to stop and reverse the scraper or box, thereby consuming in a day's work, much valuable time. My invention obviates this delay, there being no necessary stoppage in the operation of the machine from the time the first load is taken on until the last load is delivered, the dumping operation also taking place without stopping the machine.

Referring to the drawings, 1 designates the carrying-wheels, which are mounted upon opposite ends of the axle, said axle being bent upwardly to U-form at its middle to form a horizontal bridge portion 2, and the vertical side bars or pieces 3—3. A pair of horizontally arranged bars 4, are bent at their rear ends to form the horizontally disposed U-hooks, which are engaged around the axle inward of the carrying-wheels, adjacent to the lower ends of the side bars 3—3 the upper and short arms of the hooks projecting forwardly. In order to close the forward and open ends of the hooks, the link-plates 6 are provided, bolts 7 being passed through the upper ends of the link plates and also through the free ends of the arm 5, and are engaged at their outer ends by retaining nuts or keys. Bolts 8 are passed through the lower ends of said link-plates and through the tubular bosses or enlargements $6^a$ thereof, and are also passed outwardly through the lower arms of the hooks, and vertically beneath the bolts 7; the outer ends of said bolts 8 being formed with openings to receive spring-keys 9 of the usual construction. A suitable distance forward of the axle, the horizontal bars 4 are bent inwardly, and are bolted to the opposite sides of the tongue 10, to which draft animals are adapted to be attached in the usual manner, and extending transversely of the machine and supported upon the rear portion of the tongue and the side bars 4—4 are the platforms 11 and 12, the platform 12 being adapted particularly for the driver of the machine who stands thereon.

Pivoted upon the inner ends of the bolts 8 are a pair of lever-bars 13—13 which are arranged inward of the vertical bars or portions 3 of the axle, and bear against the inner faces of the bosses $6^a$, of link-plates 6, and these lever-bars 13 extend forwardly and upwardly, and are bent inward at their forward ends, and bolted to the rear end of a hand lever 14, said lever being bent to form the handle 15 at its outer end, which is in convenient reach of the driver. The rear ends of the lever-bars 13 are bent upwardly and are pivotally mounted upon bolts 16, and are interposed between the outer sides of the scraper box or pan 17, and brackets 18 bolted or otherwise rigidly secured thereto; the bolts 16 being passed also through the sides of the box or pan and through the brackets 18, and are engaged at their outer ends by spring-keys 19 in the usual manner. It will now be seen that by grasping the handle 15, the lever bars 13 may be pivotally operated upon the bolts 8, so as to raise the scraper-box or pan to the position shown in dotted lines, Fig. 2, and in order to support said box or pan in said position, I provide a catch 20, said catch being pivoted at 21 upon the cylindrical end of a bracket or bar 22 which is bolted or otherwise rigidly secured upon the platform 12. This catch-lever 20 which extends vertically upward and in longitudinal alignment with the lever-arm 14 is provided with a hook 23 at its upper end, and the inner and upper side of said hook is beveled or rounded as shown at 24, the object of which will be hereinafter explained. The catch lever is also formed with a laterally extending and horizontal arm 25 having a foot piece or enlargement 26 at its outer end, and bearing at the underside of said arm 25 is the free end of a lift-spring 27; said spring being bolted or otherwise secured to the upper side of the platform 11. The tendency of this spring is to force the hook end of the catch lever in the direction of the arrow Fig. 7, and in order to limit this movement, a stop or projection 28 is provided; this stop or projection extending forwardly from the lower end of the catch lever 20 and bearing upon the platform 12 as clearly shown in Fig. 7. It will now be seen, that as the handle is grasped and pulled downward as before explained, the lever arm 14 will come in contact with the beveled surface 24 of the catch lever, and overcoming the resistance of the lift-spring 27 will pivotally move the hook 23 in a direction opposite to that indicated by the arrow Fig. 7 until said lever arm passes from engagement with the beveled portion 24 of said hook. Immediately this takes place, the lift-spring 27 forcing the catch lever forward, the hook 23 engages over the upper side of the lever arm 14 and holds it in its depressed position as shown in dotted lines, Fig. 2. Arranged at the rear and outer side of the scraper box or pan 17 is a bracket or casting 29 which is U-shaped in plan view and has its ends secured rigidly near the upper margin of said rear side of the scraper-box, and extending horizontally through said casting or bracket and about midway of its length is a bolt 30, upon which is pivotally mounted a catch-lever 31, said lever extending in its normal position obliquely downward and to the rear and having its upper end curved upwardly preferably as shown at 32. Projecting from one side of said lever is a lug or shoulder 33, the object of which will be presently explained. Secured by bolts or other suitable means rigidly upon the bridge portion 2 of the axle and about midway its length is a bracket or casting 34, which is formed with a longitudinally extending passage or slot 35, and pivotally mounted upon the outer end of the bolt passing through said passage is a hand lever 36, the lower end of which is pivotally connected at 37 to one end of a wire or other flexible connection 38, the other end of said wire being pivotally connected to the upper curved end 32 of the catch-lever 31.

Bolted to the bar or casting 22 at its forward end is an obliquely extending lever 57, said lever extending upwardly and longitudinally and engaging the bolt passing through the bracket 34, so as to brace said bracket in its vertical position.

Extending at its upper end through the slot 35 of the casting or bracket 34 and pivotally mounted upon the bolt carrying the lever 36, is a brace bar 39, and the lower end of this brace bar is formed with a hook 40 which engages under the bolt 30 of the bracket 29, and this bar 39 adjacent to the hook portion is recessed to form a shoulder 41 which fits against the upper end of the lug or projection 33 of the catch-lever 31; said catch-lever thereby locking the bar rigidly in position. Pivotally secured at its lower and forward end to a bracket or casting 42 bolted or otherwise rigidly secured upon the platform 11 is the locking lever 43; said lever extending obliquely upward and to the rear and passing over the bridge-portion 2 of the axle is formed at its under side with a depending hook or shoulder 44, and with a handle portion 45 at its rear end. In order to limit the pivotal movement of said lever, and also to prevent it from lateral movement a guide bracket 46 is provided; this guide bracket being bolted or otherwise rigidly secured to the bridge-portion 2 of the axle adjacent to the bracket 34, and is formed with a vertical slot 47 through which the lever 43 passes. Pivotally secured to the inner sides of the scraper-box or pan and upon the inner ends of the bolt 16 are a pair of arms 48. These arms are approximately L-shaped and extending forwardly have their vertical arms 49 formed with the outwardly extending flanges or hooks 50 at their upper ends, and these hooks rest upon the upper sides of the lever-bars 13. A gate or door 51 adapted to close the front and open end of the scraper box 17 extends transversely thereof, and is preferably concaved, and has its end portions bent inwardly toward the rear at 52, so that the vertical margins 53 thereof shall fit snugly against the vertical margins of the sides of the scraper box or pan 17, when it is desired to close the scraper box or pan, and these bars 48 are bolted or otherwise rigidly secured to the inner sides of the end portions 52 of said gate.

Secured by bolts or other means to the outer side of the rear and upper margin of the scraper-box, and in longitudinal alignment with the lever 43 is a bracket 54, said bracket being formed with the rearwardly projecting and horizontal flange 55, which is adapted to be engaged by the hook 44 of said lever 43 for a purpose to be presently explained.

The general operation of the machine is as follows, the normal position being that shown in dotted lines, Fig. 2, where the scraper box is raised from the ground and the gate closes the front end thereof: Now when it is desired to load the machine, the driver by depressing the foot-lever 25, releases the lever-arm 14, allows the scraper box by gravity to descend to the position shown in Fig. 2, this operation causing at the same time the lever arm 14 to assume its elevated position, and carry the gate 52 away from the open end of the scraper box or pan. The draft animals being now driven forward the load is scraped in the usual manner into the box or pan, when the driver by grasping the handle 15 pivotally operates the lever bars 13 until the lever arm 14 is engaged beneath the hook 23 of the catch-lever 20 as before explained, and the scraper box is again raised to the position shown in dotted lines, Fig. 2. This operation of course causes the gate to move pivotally also until it shall close the open end of the scraper box, and absolutely prevent any escape of earth therefrom. The load is then conveyed to the proper place where it is to be delivered, and to dump the same, the driver first grasps the lever 36 and depresses its rear end, this movement causing the curved end 32 of the catch lever 31 to move in the drection of the arrow, Fig. 5 and disengages the lug or projection 33 from the shoulder 41 of the brace-bar 39. The driver next depresses the foot-lever 25 and pivotally operates the catch-lever 20 and allows the scraper box or pan to descend. The machine moving all this time, as soon as the scraper box is lowered, resistance is offered to the front end thereof, and this causes the pivotal operation of the scraper-box upon the bolts 16, the rear end thereof rising upwardly to the position shown clearly in Fig. 3, until the shoulder or hook 44 engages the flange or projection 55 of the bracket 54. The driver may now return to receive another load with the pan or box in this position, or he may lower it by grasping and operating the lever 14 so that it shall be disengaged from the catch-lever 20, thus allowing the pan or box by gravity to pivotally operate and assume its normal position, the box as it descends disengaging the flange 55 from the hook 44, and the bolt 30 of the pan, riding downwardly against the inner side of the brace-bar 39 until the movement of the pan or box is stopped by said bolt resting in the hook 40 formed at the lower end of said brace-bar.

From the above description, it will be seen among other important features of this invention the wheels never leave the ground when the machine is at work and the action of unloading puts no extra strain upon the horses. Also the driver is never required to leave his place on the foot platform of the machine during any of its operations, and that it is at all times under his perfect control. It will be seen also that there is no delay or stoppage of the team, or extra exertion and that all is done quietly, expeditiously and effectually, and as little time as possible is taken in the operation. Furthermore a machine of this character is produced which is exceedingly simple, strong, and durable of construction and which is positive and reliable in operation.

Having thus described my invention, what I claim as new, and desire to secure by Letters Patent, is—

1. A wheeled-scraper, comprising an axle and wheels mounted upon said axle, a pair of bars having a platform and detachably mounted upon said axle, a lever pivotally carried by said bars, and pivotally carrying an open ended scraper-box or pan, and a gate pivotally connected to said box or pan, and having hooked or flanged upper ends engaging said lever, and means to lock said lever in its depressed position, substantially as set forth.

2. A wheeled-scraper, comprising an axle, and carrying wheels mounted upon said axle, a pair of bars detachably mounted upon said axle, and a lever pivotally carried by said bars, and a scraper-box or pan pivotally carried by said lever, a cross-bolt carried by the scraper-box or pan, and a brace-bar pivotally mounted from the axle and having a hooked lower end engaging said cross-bolt, substantially as set forth.

3. A wheeled-scraper, comprising an axle, and wheels mounted upon said axle, a pair of bars detachably mounted upon said axle, and a lever pivotally carried by said bars, and pivotally carrying a scraper-box or pan having an open front end, a cross-bolt carried at the rear end of said scraper-box or pan, a catch-lever pivotally mounted upon said bolt, and having a lug, and a brace-bar pivotally supported from said axle and having a shoulder engaging said lug and a hook engaging said bolt, and a lever pivotally supported from said axle and flexibly connected to the catch-lever, substantially as set forth.

4. A wheeled-scraper, comprising an axle and wheels mounted thereon, a pair of bars detachably mounted upon said axle and having a platform, a lever pivotally carried by said bars, and pivotally carrying a scraper-box or pan, and a flange projecting from the rear end of the box or pan, and a lever pivotally mounted upon the platform of the bars carried by the axle, and having a hook or shoulder at its upper end, and means to pivotally operate the scraper-box or pan so that the flange thereof shall engage the hook or shoulder of the lever pivotally carried by said platform, substantially as set forth.

5. A wheeled-scraper, comprising an axle and wheels mounted thereon, bars carried by said axle and having a platform, a lever pivotally carried by said bars, and pivotally carrying a scraper-box or pan, a cross-bolt carried by the scraper-box or pan at its rear upper margin, and a flange also carried by said scraper-box or pan, a catch-lever pivotally mounted upon said cross bolt and having a lug, a brace-bar pivotally supported from the axle and having a shoulder engaging said lug and a hook engaging said cross-bolt, and a lever pivotally supported from the axle, and operatively connected to the catch-lever, and a lever pivotally mounted upon the platform, and having a hook or shoulder adapted to engage the said flange, substantially as set forth.

6. In a wheeled-scraper, comprising an axle and wheels mounted thereon, a pair of side bars having their rear ends hooked around the axle, and having the open end of said hooks closed by detachable link-plates, bolts passing through the upper ends of said link plates and also through the free ends of said hooks, and bolts passing through the lower ends of said link plates and also through said side bar, and a lever-bail, pivotally mounted upon the last mentioned bolts, and keys passed through the end of said bolts to secure them in place, a scraper-box or pan, and brackets bolted to the scraper-box or pan, and bolts passing through said scraper-box and also through said brackets and pivotally engaging the rear ends of said lever-bail, and keys passing through the outer ends of said bolts to prevent their displacement, substantially as set forth.

7. A wheeled scraper, comprising an axle and wheels mounted upon said axle, side bars detachably connected to said axle and a platform carried upon the forward ends of said side bars, and a casting secured thereon, a lever-bail pivotally carried by said side-bars and pivotally carrying a scraper box or pan, a cross bolt carried by said box or pan, and a catch-lever pivotally mounted upon said cross bolt having a lug, and a bracket carrying said cross bolt and secured to the said box or pan, and a bracket secured upon the bridge portion of the axle, and a bolt passing through said bracket, and a brace bar secured at its opposite ends to said bolt and to the casting carried by the platform, and a lever pivotally mounted upon said bolt, and operatively connected to the catch-lever of the scraper-box, and a brace bar pivotally carried upon the bolt of the bracket supported by the bridge portion of the axle, and having a hook at its lower end engaging the cross bolt of the scraper box or pan, and a shoulder engaging the lug of the catch-lever, substantially as set forth.

8. A wheeled scraper, comprising an axle and wheels mounted thereon, a pair of side bars detachably carried by said axle, and carrying platforms upon their outer ends, a casting secured upon one of said platforms, and a catch lever having a horizontal arm and a vertical hook arm, and pivotally mounted upon said casting, and a lift-spring carried by the other platform and bearing against the under side of said lever arm, and a lever-bail pivotally carried by the side bars and pivotally carrying a scraper box or pan and adapted to be engaged by the hook end of the spring-actuated catch lever, substantially as set forth.

In testimony whereof I affix my signature in the presence of two witnesses.

JOHN R. WILLIAMS.

Witnesses:
MAUD FITZPATRICK,
M. P. SMITH.